(12) United States Patent
Ohmer

(10) Patent No.: US 7,755,770 B2
(45) Date of Patent: Jul. 13, 2010

(54) METHOD FOR MAPPING GEOMETRICAL FEATURES WITH OPTO-ELECTRONIC ARRAYS

(75) Inventor: Herve Ohmer, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1108 days.

(21) Appl. No.: 11/308,431

(22) Filed: Mar. 24, 2006

(65) Prior Publication Data

US 2007/0236688 A1 Oct. 11, 2007

(51) Int. Cl.
*G01B 11/24* (2006.01)

(52) U.S. Cl. .................................... 356/601

(58) Field of Classification Search .............. 356/601, 356/429, 430, 431
See application file for complete search history.

(56) References Cited

U.S. PATENT DOCUMENTS

| | | | | |
|---|---|---|---|---|
| 4,247,204 A | * | 1/1981 | Merlen et al. | 356/431 |
| 4,330,775 A | * | 5/1982 | Iwamoto et al. | 382/141 |
| 4,741,621 A | | 5/1988 | Taft et al. | |
| 4,791,481 A | * | 12/1988 | Verdiere et al. | 348/88 |
| 4,914,514 A | | 4/1990 | Smith | |
| 4,920,385 A | | 4/1990 | Clarke et al. | |
| 4,929,845 A | * | 5/1990 | Amir et al. | 250/559.05 |
| 5,048,965 A | * | 9/1991 | Amir | 356/604 |
| 6,025,905 A | | 2/2000 | Sussman | |
| 6,028,672 A | * | 2/2000 | Geng | 356/602 |
| 6,947,119 B2 | * | 9/2005 | Fukagawa | 355/52 |
| 7,193,699 B2 | * | 3/2007 | Michelsson | 356/237.5 |
| 2001/0037694 A1 | * | 11/2001 | Freifeld | 73/865.8 |
| 2002/0060795 A1 | * | 5/2002 | Metcalfe et al. | 356/603 |
| 2004/0150861 A1 | * | 8/2004 | Van Der Heijden | 358/406 |
| 2004/0258293 A1 | * | 12/2004 | Rouse et al. | 382/141 |
| 2005/0125980 A1 | | 6/2005 | Rakow, Jr. | |
| 2006/0192931 A1 | * | 8/2006 | Roberts et al. | 355/55 |
| 2006/0192943 A1 | * | 8/2006 | Roberts et al. | 356/124 |
| 2006/0192947 A1 | * | 8/2006 | Roberts et al. | 356/237.1 |
| 2006/0285122 A1 | * | 12/2006 | Bankhead et al. | 356/511 |

FOREIGN PATENT DOCUMENTS

| | | |
|---|---|---|
| EP | 0671679 A1 | 9/1995 |
| EP | 1102087 A2 | 5/2001 |
| GB | 2403006 A | 12/2004 |
| WO | 03028360 A2 | 4/2003 |
| WO | 2004055474 A1 | 7/2004 |
| WO | 2005061861 A1 | 7/2005 |

* cited by examiner

*Primary Examiner*—Roy Punnoose
(74) *Attorney, Agent, or Firm*—Osha Liang LLP; David G. Matthews; Rodney V. Warfford

(57) ABSTRACT

A method for inspecting a surface of an object, including scanning the surface using an array of opto-electronic sensors, obtaining a reflected light signal from a location on the surface, combining the light signals to form a representation of geometrical features of the surface, and processing the representation to obtain geometric quantities of the geometrical features. An apparatus for inspecting a well screen, including an array of a plurality of opto-electronic sensors, a motion control unit, and a processor for obtaining a geometric quantity of the well screen based on an image obtained by the sensor array and the location registered by the motion control unit.

24 Claims, 7 Drawing Sheets

METHOD FOR MAPPING GEOMETRICAL FEATURES WITH OPTO-ELECTRONIC ARRAYS

BACKGROUND OF INVENTION

1. Field of the Invention

The invention relates generally to systems and methods for mapping geometrical features. In particular, embodiments of the present invention relate to systems and methods for inspecting screens used in oil and gas industry.

2. Background Art

In the drilling of oil wells, referring to FIG. 1, typically a wellbore 12 is drilled throw a geological formation 14 containing fluids such as oil. The wellbore 12 is protected with a casing 16 having perforations 18 through which fluids flow from formation 14 into the wellbore 12. The fluids are pumped out of the wellbore using any artificial lift, such as gas lift or a pumping system 10, which may be an electro-submersible pump, progressive cavity pump, rod pump, hydraulic jet pump, or diaphragm pump. The fluids flowing into the wellbore often include undesirable particles such as sand, which may result in inefficient oil production due to obstruction of fluid flow, wearing of the pumping system, and casing failure caused by formation corrosion. Therefore, sand control is often necessary.

In order to control sand, usually a sand screen is placed in the wellbore to screen out the sand particles while allowing the fluids to flow through. As shown in FIG. 1, a packer 13 may be used to isolate the pumping system 10 from the completion. The packer 13 has a sand screen 15 attached thereto. Under the action of drawdown produced by the pumping system 10, fluids are forced through the sand screen 13. One of the most commonly used screens is a wire-wrapped screen, formed by helically wrapping wires around a length of perforated base pipe. Sand screens may be attached to a packer that protects a pumping system (as shown in FIG. 1) or to a production string deployed in the production zone. Wire wrapped screens may be used, alone or in combination with gravel-packing, either in open-hole or in cased-hole. A method of constructing wire-wrap well screens has been described in U.S. Patent Application Pub. No. 2005/0125980.

The filtering performance is a direct function of the size of the gap between adjacent turns of wires as only particles smaller than the gap will be allowed to commingle with the fluid produced in the well. The gap also determines fluid flow efficiency because if the gap is too small, fluid flow may be restricted, and the screen may be clogged easily. Referring to FIG. 2A for a typical screen in the art, the gaps 21 between the long wires 22 are generally on the order of 100 microns, and the wire itself usually has a width on the order of 1 millimeter. FIG. 2B illustrates a cross-sectional view of a screen. Wire-wrapped well screens may be of large size, and are often several tens of feet long. Thus, there are usually a large number (tens of thousands) of repetitive patterns within one screen.

Because the widths of gaps 21 between wires 22 are critical for sand control, it is important to inspect the screen in a fast and economical way and subsequently to maintain the screen. The gaps should be as uniform as possible throughout the screen. Conventional inspection techniques involve manual methods using a gauge or an optical scope to measure the gap widths. Due to the small sizes of the gap widths, usually an enlarged image from a magnifying lens is required in order to measure the widths. Some of these techniques have been disclosed, for example, in U.S. Pat. No. 4,914,514. Conventional techniques are often inefficient and are subject to human errors. More recently, automated optical inspection methods have been disclosed, for example, in U.S. Patent Application Pub. No. 2004/0258293, which describes using a camera to capture images of a portion of the screen to determine the distances between wires. Due to the large size of a screen, still only a subset of sample sections may be examined, and statistical techniques are often used to characterize the quality of a screen using quantities such as the average gap width and the statistical variance about the average.

Therefore, there still exists a need for new approaches for inspecting a screen or other large geometrical features in a fast, accurate, and economic way.

SUMMARY OF THE INVENTION

One aspect of the invention relates to a method for inspecting a surface of an object, including scanning the surface using an array of opto-electronic sensors, obtaining a reflected light signal from a location on the surface, combining the light signals to form a representation of geometrical features of the surface, and processing the representation to obtain geometric quantities of the geometrical features.

In another aspect, embodiments disclosed herein relate to system and apparatuses for inspecting a well screen, including a sensor array made of a plurality of opto-electronic sensors, a motion control unit, and a processor.

Other aspects and advantages of the invention will become apparent from the following description and the attached claims.

It is to be understood that the drawings are to be used for the purpose of illustration only, and not as a definition of the metes and bounds of the invention, or as a basis for reading non-existent or un-recited limitations into the claims.

DETAILED DESCRIPTION

In one aspect, embodiments of the present invention relate to methods for inspecting geometrical features of composite assemblies, such as filters and screens used in the oil and gas industry. The method and system in accordance with embodiments of the present invention can also be applied to inspecting other structures having a large number of generally repetitive patterns, such as pre-perforated flat or cylindrical products, woven metallic or non-metallic compositions, corrugation or embossing.

Embodiments of the present invention employ a plurality of opto-electronic sensors that form an array. The sensors may include laser sensors or machine vision cameras, or a combination of both. When using a laser sensor, a laser produces a small light spot on the surface to be inspected. A discontinuity on the surface, i.e., a gap between wires, results in a loss of a light spot. Such an event can trigger a mark, which can be recorded along with motion coordinates provided by a motion control unit. With proper calibration, the adjacent marks are then combined into a digital geometric image. In accordance with some embodiments of the invention, a photo-detector in the array detects the brightness of the light spot. A map of the brightness can be generated during the scan and can be used to analyze geometrical features of the surface.

When using machine vision cameras, a motion control unit moves the object to be inspected, or moves a camera or a plurality of cameras to scan the surface and record an image of the surface. Processing of digital pixels combined with an adequate calibration of the system is then translated into quantitative 2-D information. In addition, machine vision cameras may require a light source to illuminate the surface when natural lighting is not available.

For a single-axis linear array, when the surface to be inspected is flat, scanning is usually performed through a linear motion either parallel to the array axis or transverse to the array axis. When the surface is cylindrical, scanning is usually performed through a rotational motion around the cylinder axis. In accordance with some embodiments of the present invention, scanning may also be performed by successive iterations of linear and/or rotational motions.

Figure 1:
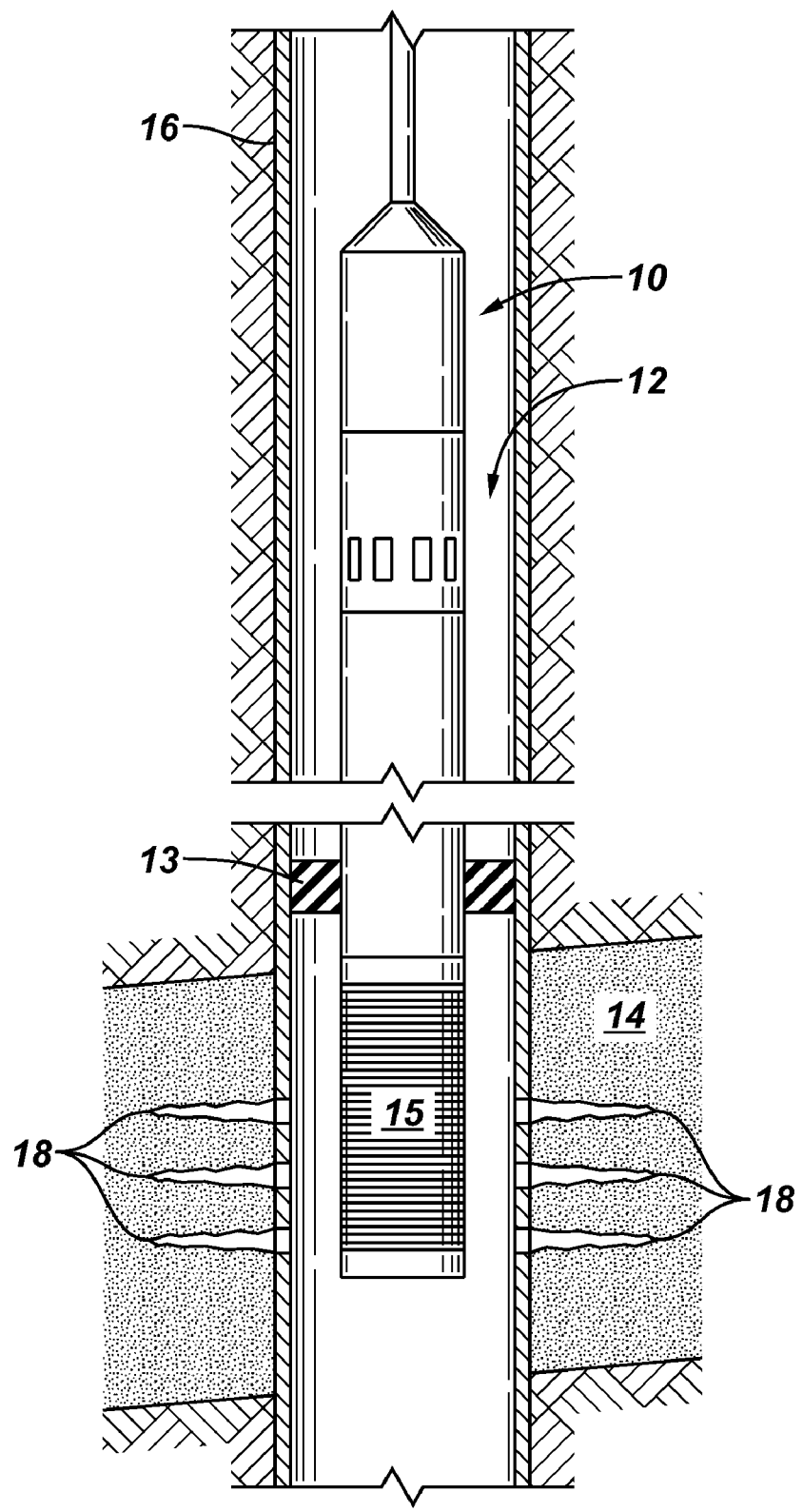
FIG. 1 illustrates a typical wellbore for production of oil in the prior art.
Figure 2A:
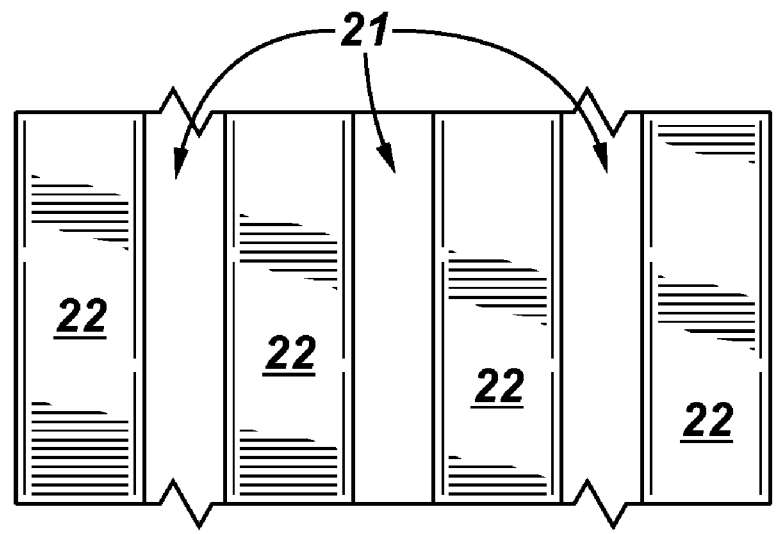
FIG. 2A shows a close-up picture including an enlarged section of the surface of a wire-wrap screen in the prior art.
Figure 2B:
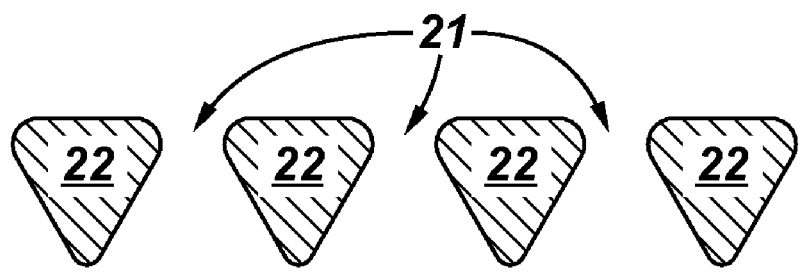
FIG. 2B shows a cross-sectional view of a section of a wire-wrap screen in the prior art.
Figure 3:
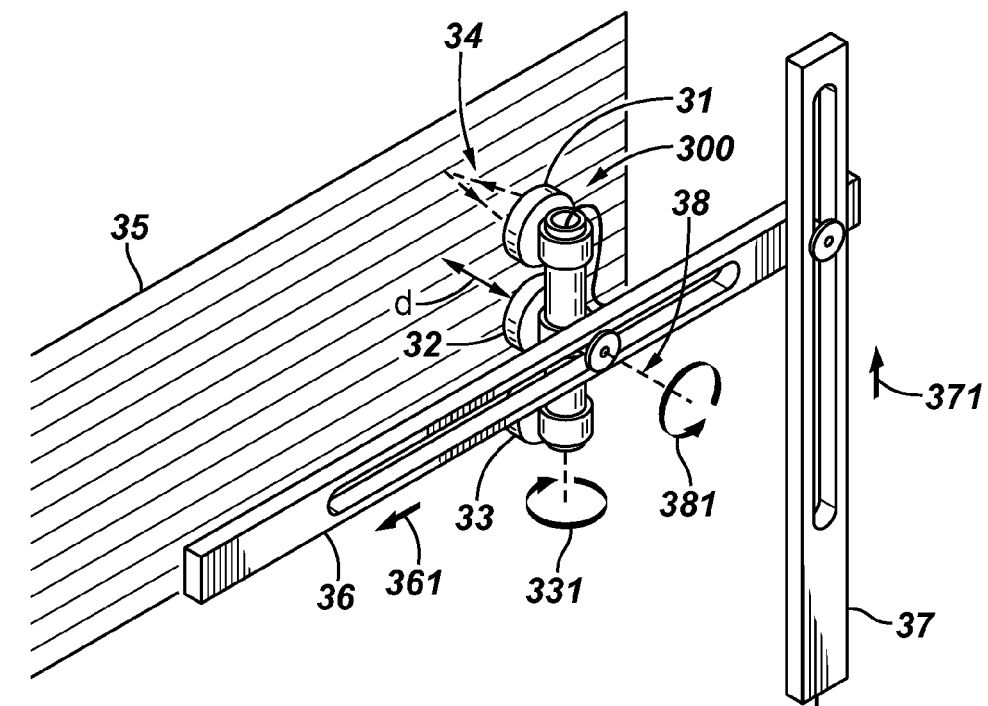
FIG. 3 shows an exemplary inspecting system in accordance with embodiments of the present invention.
Figure 3:
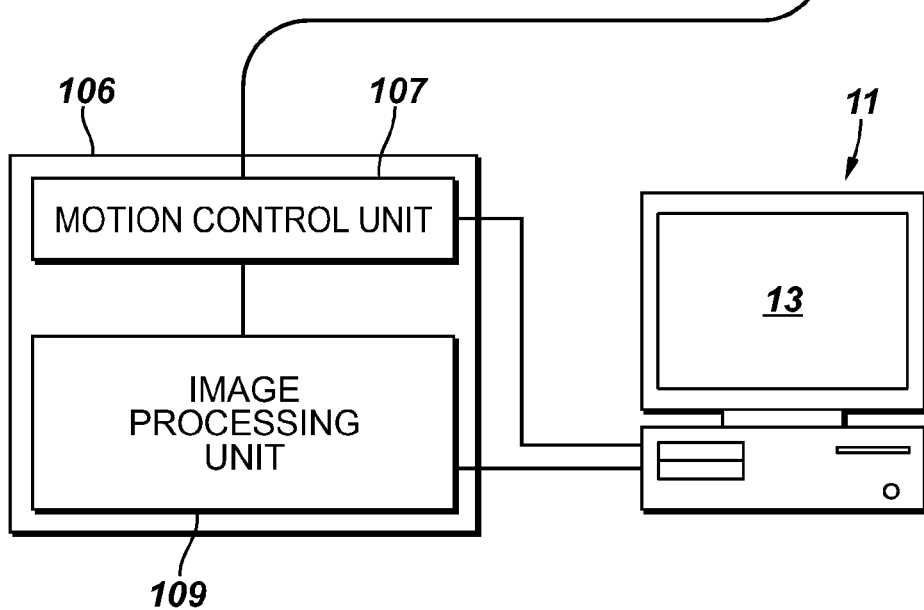

An exemplary surface inspection system is illustrated in FIG. 3. Although only three opto-electronic sensors 31, 32 and 33 are shown here to form an array 300, it will be recognized by those skilled in the art that the array may include any number of sensors. In the case that the sensor 31 comprises a laser, the laser sends out a laser beam 34 and illuminates a spot on the surface 35 to be examined. The reflected light signal is captured by a photo-detector in the array 300. Although the sensors 31, 32 and 33 shown in FIG. 3 are mechanically linked together and move collectively, in accordance with other embodiments of the present invention, the sensors can move independently. In this case, the independent motions are associated with independent position detections, so that an optical sensing is always associated with a spatial location.

The array 300 is shown to be attached to and is movable along a rail 36. The rail 36 is movable along another rail 37. During operation, the sensor array 300 is brought to a predetermined distance d from the surface 35, and driven by a motor, the array 300 can move along the rail 36 in a direction 361, and the rail 36 can move along the rail 37 in a direction 371. Hence, the array 300 can move freely to scan the whole surface 35. Furthermore, according to some embodiments, the array 300 may rotate around an axis 38, as shown by the arrow 381. An individual sensor 33 may also rotate, as indicated by the arrow 331, around the linear axis of the array 300. In this case, the sensor is capable of scanning an area away from the location closest to the sensor on the surface. In addition, the array 300 may be moving in the direction along the rail 36 and/or the rail 37, and during the linear motion, the array 300 may be directed to rotate around the axis 38, or rotate to a certain angle relative to the rail 36, and individual sensors may also have the freedom to move. In most operations, the distance d is kept constant, i.e., the array 300 generally scans the surface 35 in directions parallel to the surface 35.

The motion of the array 300 is controlled by a motion control unit 107 within an electrical circuit 106, which, in turn, may receive commands from a computer 11. The electrical circuit 106 may also include an image processing unit 109, which may also receive commands from the computer 11 for collecting data, receiving the relative positions of the array 300 and/or the surface 35, and process the obtained images. The images may be displayed on the computer display 13. In addition, the computer 11 may include readable media such as a CD-ROM disks, floppy disks, hard-disk drives, and flash drives, which contain programs of instructions for controlling motion, collecting and storing data, processing images, and performing quantitative and statistical analysis.

Although FIG. 3 illustrates only one embodiment of the configuration for the array and the means for controlling motion, many other configurations and motion control means are known in the art and can be implemented in accordance with embodiments of the present invention. For example, the array 300 may be a 2-D array, and the motion may be achieved using a motor and a carriage or other mechanical means. In addition, the surface 35 to be inspected does not have to be in a fixed position. By moving the surface 35 and/or the array 300, a relative motion between the surface 35 and the array 300 may be realized and the scan can be performed. In addition, the surface 35 does not have to be flat. Other shapes of surfaces, such as cylindrical surfaces may be examined. Various scanning options may be implemented, depending on the array topology and the complexity of the surface to be inspected.

In accordance with embodiments of the present invention, scanning motions do not have to be exhaustive over the entire screen. Instead, a random analysis protocol may be employed such that the scans cover only a representative fraction of the whole target area. Parameters governing the area sampling protocol may be entered by an operator and/or generated by a computer program. These parameters may also be automatically altered in the course of a scan process based on real-time measurement results. For example, if anomalies occur at a rate higher than a preset value, a higher-density random scanning may be triggered. In some cases, a 100% scan coverage may be triggered, at least in areas surrounding a detected anomaly.

Figure 4:
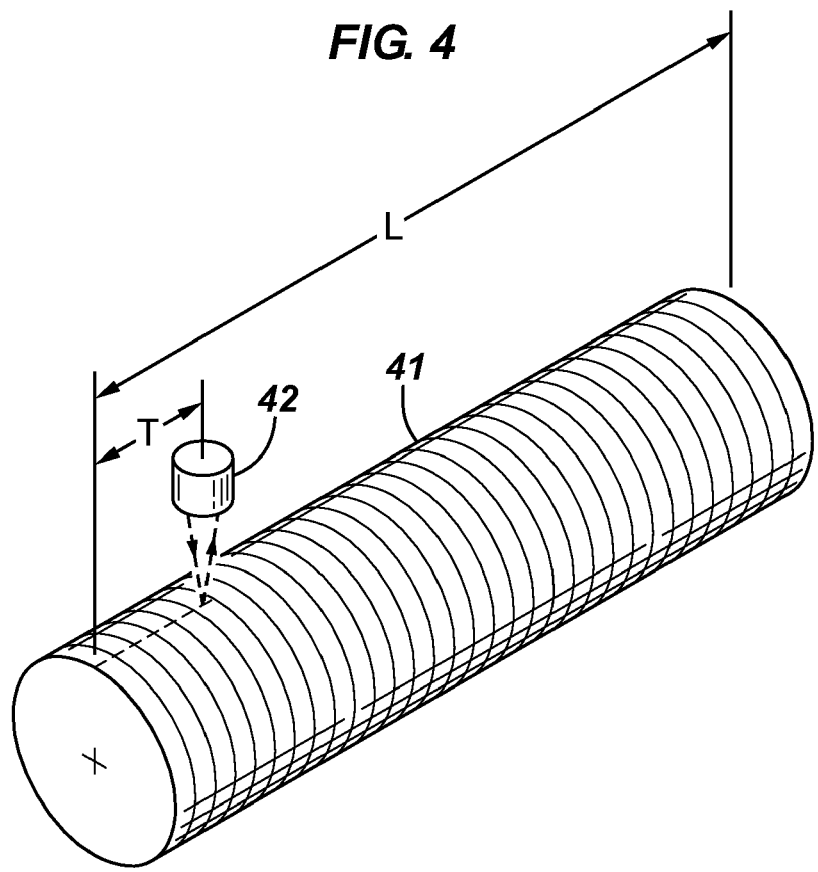
FIG. 4 illustrates a method of using a single sensor to scan in a direction parallel to a cylindrical object.
Figure 5:
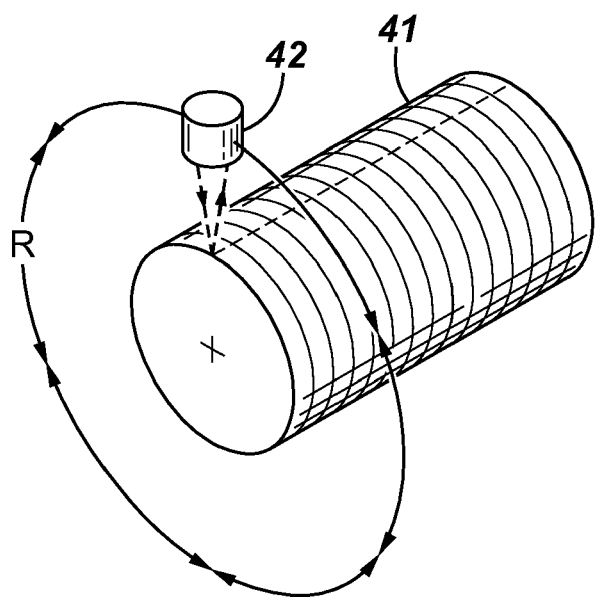
FIG. 5 illustrates a method of using a single sensor to scan around a cylindrical object.

Referring to FIG. 4, wherein a cylindrical surface 41 of a length L is to be inspected by a single sensor 42. The sensor 42 may be directed to move linearly along the axis of the cylindrical surface 41, and the distance T is registered. In addition, as illustrated in FIG. 5, the sensor 42 may rotate around the axis of the cylindrical surface 41 while being at a fixed radius R from the axis. Alternatively, the sensor 42 may be at a fixed position and the surface 41 may be rotated while being scanned by the sensor 42. In accordance with some embodiments of the present invention, both the sensor 42 and the surface 41 may be controlled to move in order to achieve a better scan efficiency. The relative scanning motion may have a fixed or a variable speed, and may be in continuous or discrete motion mode.

Figure 6A:
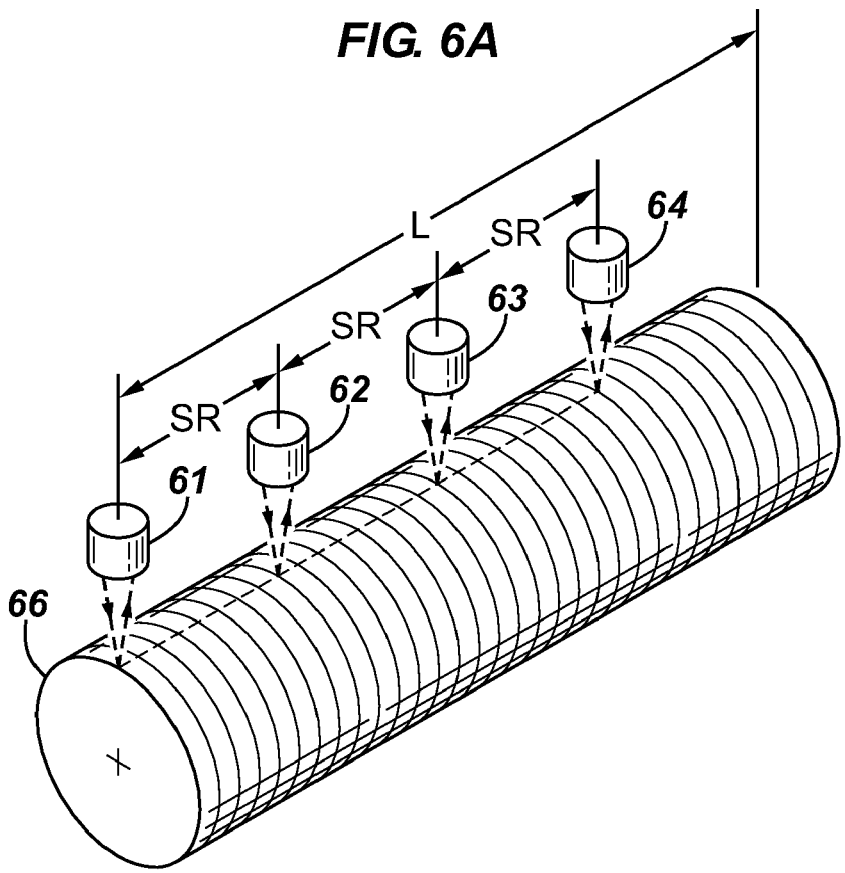
FIGS. 6A and 6B illustrate a surface mapping method using an array of sensors to scan in a direction parallel to a longitudinal axis of an elongated object.
Figure 6B:
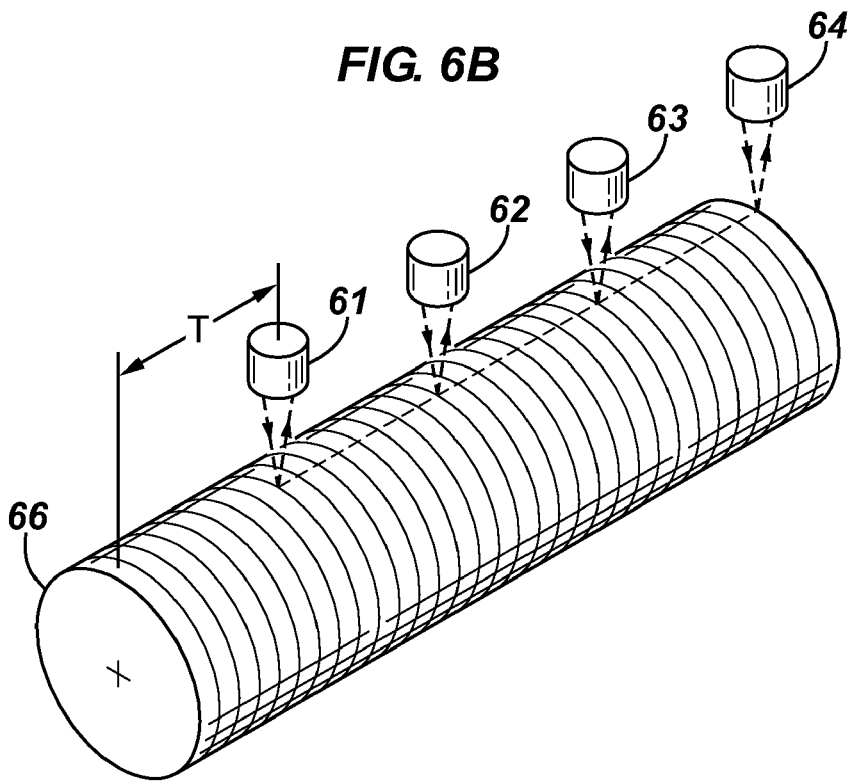

FIGS. 6A and 6B illustrate a surface mapping method using an array of sensors 61-64 to scan a cylindrical surface 66 of a length L. The sensors are spaced at a fixed distance SR from each other. As shown in FIG. 6B, only a fraction of motion with a distance T parallel to the longitudinal axis of the surface 66 is needed to cover the whole length L of the surface 66. In addition, the sensors can be controlled to rotate around the cylindrical surface 66, or alternatively the cylindrical surface 66 can rotate around its axis, or both the sensors and the surface are in motion, so long as a relative motion is achieved to perform a desired scan. The relative scanning motion may have a fixed or a variable speed, and may be in continuous or discrete motion mode. The sensors in the array do not have to move collectively as shown in the exemplary configuration in FIGS. 6A and 6B. The sensors may be controlled to move individually to achieve a desired scan.

Figure 7A:
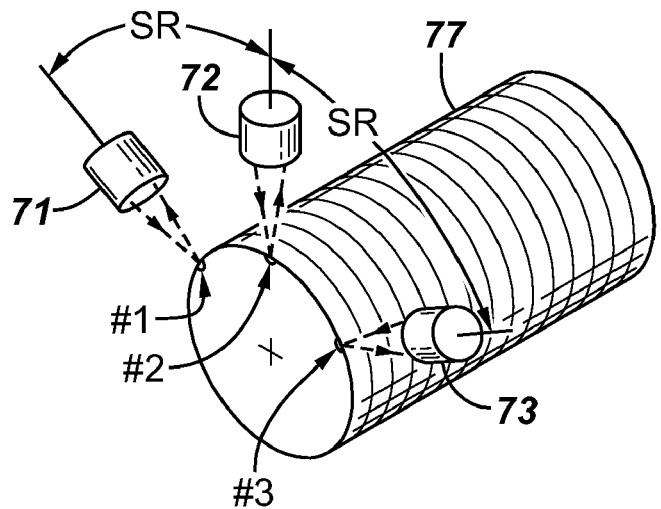
FIGS. 7A and 7B illustrate a surface mapping method using an array of sensors to scan in a direction around a longitudinal axis of an elongated object.
Figure 7B:
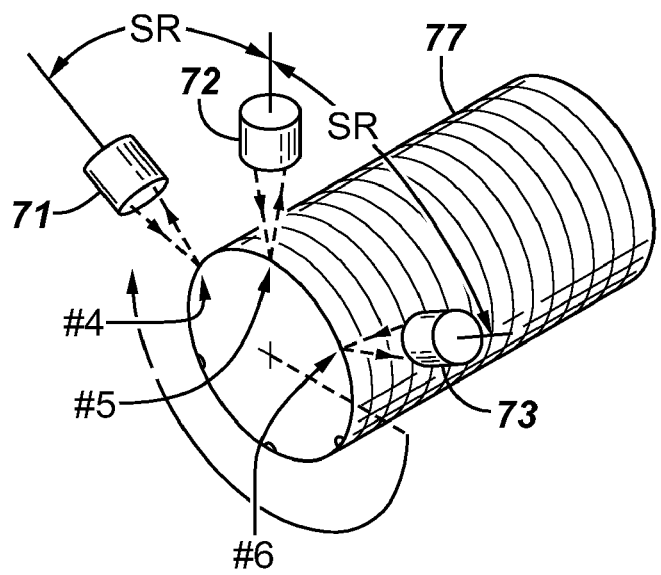

FIG. 7A illustrates an array of sensors 71-73 arranged at a constant distance around a cylindrical surface 77. The distance between the sensors may also have a fixed value SR. Sensors 71-73 capture light reflected from #1, #2, and #3, respectively, on the surface 77. As shown in FIG. 7B, the relative motion between the sensors and the surface does not need to be a full circle. Only a half circle of relative motion caused by rotating the surface, or by rotating the sensor array, or both, is sufficient to cover the whole circle including locations #4, #5, and #6. The sensors may be pre-configured to be mechanically and/or electrically linked so that they act as a single entity during the array/surface relative motion. In such a case, only one motion control per axis is needed. The sensors may also be pre-configured during an initialization phase. They move and self-adjust their relative locations and positions while the scanning is being performed.

Figure 8:
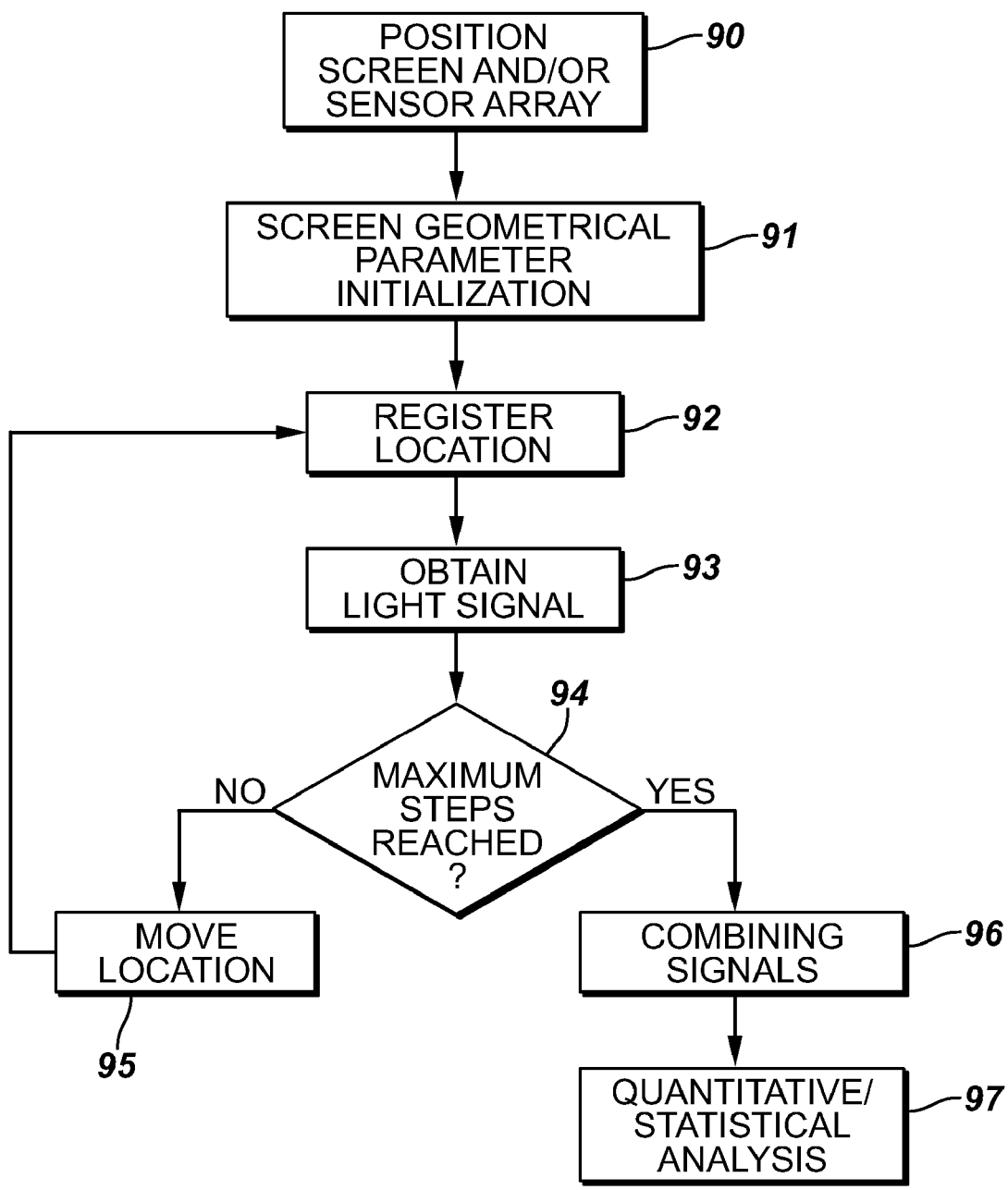
FIG. 8 illustrates exemplary operations for a well screen inspection using a opto-electronic sensor array.

Exemplary operation steps for inspecting a well screen are illustrated in FIG. 8. At step 90, the screen and/or the sensor array are positioned such that the sensor array points to a starting location on the screen to be inspected. Geometrical parameters, such as the size of the screen, are initialized at step 91. This step may include data entry from a manufacturing database, data entry from an operator, and initial measurements during the initial setup phase. The coordinates of the location are registered, for example, by a computer at step 92. This step may At step 93, a light signal is obtained and recorded corresponding to the registered location. If a single laser beam is used as the lighting source, depending on the photo-detector/sensor type used, the light signal may be a digitized intensity signal or an image of a light spot. If an array is deployed, the light signal is an opto-electronic image covering an area around the location. A maximum number of scan steps may be specified, for example, using a maximum scan time period or a maximum size of the screen. If the maximum number of specified steps is reached as determined at step 94, then at step 96 the light signals are combined to form an image, which is processed and quantitatively analyzed at step 97. The analysis may include statistical analysis to obtain quantities such as the mean value of the size of the gaps in the screen and the variance of the size. If the maximum number of steps is not yet reached, the screen and/or sensor array are moved to a next location at step 95, and steps 92-94 are repeated.

In accordance with some embodiments of the present invention, an array may include a plurality of sensing units. Each unit as well as individual sensors may move independently. A combination is thus possible using a master motion of the array as a whole, while each sensing unit may have an independent location adjustment. This method allows a sensing unit to pause for a fraction of time while the whole array is in continuous motion while scan is being performed.

Advantages of the present invention may include one or more of the following: (a) faster scanning; (b) larger coverage area; (c) higher measurement accuracy when a small laser spot is used; (d) flexibility with independent movement of individual sensors in the array.

While the invention has been described with respect to a limited number of embodiments, those skilled in the art, having benefit of this disclosure, will appreciate that other embodiments can be advised which do not depart from the scope of the invention as disclosed herein. Accordingly, the scope of the invention should be limited only by the attached claims.

What is claimed is:

1. A method for inspecting a surface of an object, comprising:
    scanning the surface using an array of opto-electronic sensors, wherein the array can rotate around a first axis of the array and the sensors can rotate around a second axis of the array;
    obtaining reflected light signals from a location on the surface;
    combining the light signals to form a representation of geometrical features of the surface; and
    processing the representation to obtain geometric quantities of the geometrical features.

2. The method of claim 1, wherein the scanning is performed through a relative motion means that causes a relative motion between the array and the surface by moving at least one of the surface and the array, and wherein the relative motion is at least one of a continuous motion and a discrete motion.

3. The method of claim 2, wherein the relative motion is controlled by a motion control unit and is at least one selected from the group consisting of linear motion parallel to the array axis, linear motion transverse to the array axis, and rotational motion around a cylindrical object axis.

4. The method of claim 3, wherein the sensors are pre-configured to move collectively.

5. The method of claim 3, wherein the sensors move independently.

6. The method of claim 1, wherein the surface is a wire-wrap sand screen surface for use in subsurface wells.

7. The method of claim 1, wherein the representation is a digital representation and said processing utilizes digital image processing.

8. The method of claim 1, wherein said processing comprises performing statistical analysis to obtain a mean value of a geometric quantity and a statistical variance about the mean value.

9. The method of claim 1, wherein the array of opto-electronic sensors comprises at least one laser and one photo-detector.

10. The method of claim 9, wherein said obtaining comprises using the photo-detector to detect a light spot on the surface illuminated by the laser.

11. The method of claim 10, wherein said combining the light signals comprises interpreting a lack of light spot as a discontinuity in the surface.

12. The method of claim 11, wherein said combining the light signals further comprises registering a coordinate in the surface provided by a motion control unit.

13. The method of claim 9, wherein said obtaining comprises detecting a brightness of a light sport on the surface illuminated by the laser.

14. The method of claim 13, wherein said combining the light signals comprises constructing a map of brightness.

15. The method of claim 1, wherein the array of opto-electronic sensors comprises at least one machine vision camera.

16. The method of claim 15, wherein the camera is a CCD camera, and wherein said obtaining comprises recording an image of a portion of the surface, and wherein said processing comprises digital processing of CCD pixel readouts and a calibration of a relationship between a distance between CCD pixels and the geometric quantities.

17. The method of claim 1, further comprising:
scanning a representative fraction of a screen based on a scan protocol;
detecting a frequency of occurrence of anomalies based on a statistical analysis; and
revising the scan protocol based on the detected frequency of occurrence of anomalies.

18. A system for inspecting a surface of an object, comprising:
an array of opto-electronic sensors, wherein the array can rotate around a first axis of the array and the sensors can rotate around a second axis of the array;
a motion control unit for causing a relative motion between the object surface and the array; and
a computer system configured to perform operations comprising:
controlling the relative motion between the object surface and the array via the relative motion unit;
registering a location of the array relative to the object surface;
capturing an image representation of geometrical features of the location on the surface using the array;
calibrating a relation between a size of the image representation and a size of a geometrical feature on the surface; and
calculating the size of the geometrical feature based on the captured image representation and the calibrated relation.

19. An apparatus for inspecting a well screen, comprising:
a sensor array comprising a plurality of opto-electronic sensors, wherein the array can rotate around a first axis of the array and the sensors can rotate around a second axis of the array;
a motion control unit for controlling a relative motion between the well screen and the sensor array and for registering a coordinate of a location of the array relative to the well screen; and
a processor for obtaining a geometric quantity of the well screen based on an image obtained by the sensor array and the location registered by the motion control unit.

20. The apparatus of claim 19, wherein the plurality of opto-electronic sensors move together.

21. The apparatus of claim 19, wherein the plurality of opto-electronic sensors move independent of each other.

22. The apparatus of claim 19, wherein the opto-electronic sensors comprise a plurality of lasers and photo-detectors.

23. The apparatus of claim 19, wherein the opto-electronic sensors comprise at least one CCD camera.

24. The apparatus of claim 19, wherein the array further comprises a plurality of sensing units, and wherein the sensing units move independently.

* * * * *